Sept. 18, 1973  G. YOUNG  3,759,720
FOOD PACKAGING SYSTEM AND TEMPERATURE-RESISTANT INSERT THEREOF
Filed Sept. 27, 1971  2 Sheets-Sheet 2

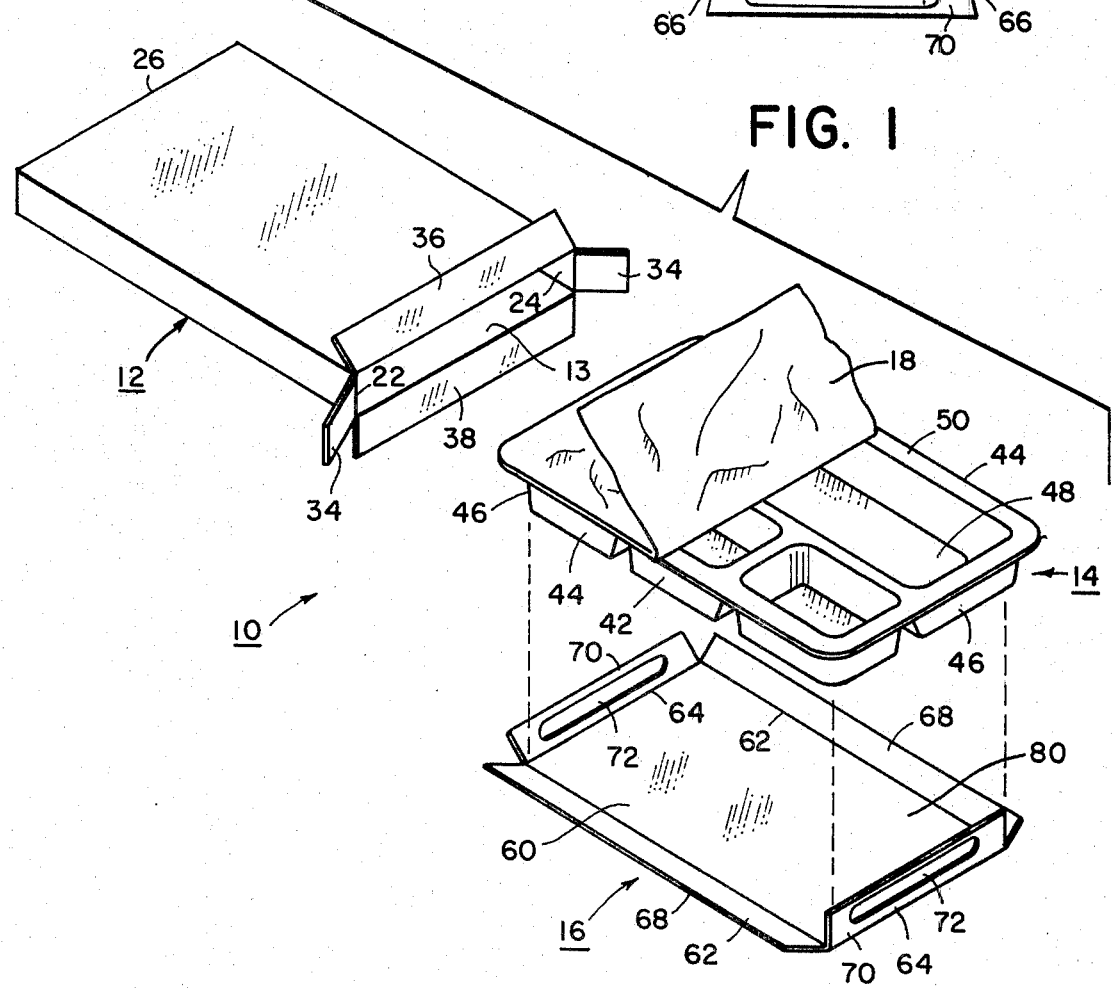

INVENTOR.
GAR YOUNG
BY
Karl L. Spivak
ATTORNEY.

United States Patent Office 3,759,720
Patented Sept. 18, 1973

3,759,720
FOOD PACKAGING SYSTEM AND TEMPERATURE-RESISTANT INSERT THEREOF
Gar Young, 1438 S. Broad St., Philadelphia, Pa. 19146
Filed Sept. 27, 1971, Ser. No. 183,816
Int. Cl. B65d 85/00, 5/38, 5/50
U.S. Cl. 99—171 H                    2 Claims

ABSTRACT OF THE DISCLOSURE

A food packaging system having an outer sleeve defining an inner compartment in which a food tray and a temperature resistant insert is disposed. The food tray has a bottom wall supported on a bottom section of the temperature resistant insert. The temperature resistant insert has upstanding side panels and end panels which are integrally formed with the bottom section and which are disposed adjacent side walls and end walls, respectively, of the food tray. The end panels have die-cut finger gripping openings disposed therein, and the end panels are disposed adjacent end closures of the under sleeve.

BACKGROUND OF THE INVENTION

Field of the invention

This invention relates to food packaging systems and to temperature resistant inserts thereof. More specifically, this invention relates to food packaging systems in which food is contained in a tray, and is either served cold from the freezer or refrigerator, or is served hot from the oven; and to temperature-resistant inserts for use as a protective mat to support the hot or cold food tray and prevent damage to furniture surfaces.

Description of the prior art

Food packaging systems, such as pre-cooked, frozen dinners, have become quite popular. These food packaging systems include a food tray, a tray cover and an outer sleeve. The food tray has one or more food compartments therein for containing the pre-cooked food, and the tray cover which is made preferably of aluminum foil and contains instructions thereon, is disposed over the open end of the food tray. The food tray with the cover thereon is packaged within an outer sleeve which is sealed, or closed at its ends. These food packaging systems are normally kept in freezer units for sale, and prior to use.

Oftentimes, the food tray is removed from the outer sleeve and placed on a supporting surface while still cold, or immediately after the food has been prepared in an oven, in which case the food tray is hot. The cold or hot food tray can cause damage to the supporting surface by leaving rings, stains, scratches, and the like thereon. In addition, when the food tray is hot the supporting surface can be burned, and thereafter require refinishing which is expensive. Even when a protective placemat is utilized to support the hot food tray thereon damage can result to a supporting surface as a result of ineffective heat resistance of such placemat.

SUMMARY OF THE INVENTION

This invention relates to a food packaging system, such as a pre-prepared frozen dinner, which includes a temperature-resistant insert therein for use in supporting a hot or cold food tray, and which is sufficiently resistant to both heat and cold to prevent damage to a supporting surface upon which the insert is placed to support the food tray. This invention relates to any packaging system in which a tray containing food is either hot or cold at some time during handling and/or preparation of the food, but for purposes of illustration, the present invention will be described with respect to pre-prepared frozen dinners. The insert is separated from the food tray prior to heating and can later serve either as a tray or as a temperature resistant place mat for the food tray.

The food packaging system of this invention includes an outer sleeve defining an inner compartment, and a temperature resistant insert and a food tray containing pre-prepared frozen dinners disposed within said inner compartment. The outer sleeve has end closures which are sealed, or secured in a closed position by any other suitable means, to enclose and maintain the food tray and temperature resistant insert therein. The food tray has a bottom wall which is supported on a bottom section of the temperature-resistant insert. The temperature-resistant insert also includes side panels and end panels upstanding from, and integrally formed with the bottom section thereof. Each side panel is disposed between a side wall of the food tray and an adjacent inner side surface of the inner compartment of the outer sleeve. Each end panel is disposed between an end wall of the food tray and an adjacent inner surface of the end closures of the outer sleeve. The end panels are preferably provided with finger-gripping means, such as die-cut, elongate openings, to permit gripping of the temperature-resistant insert to transport the hot food tray to the desired dining area. The heated tray may be placed upon the temperature resistant insert for carrying purposes and the die-cut end openings permit convenient lifting without danger of burning the fingers.

The temperature-resistant insert, or mat, includes a self-supporting substrate, such as paperboard or other similar material; and a thin, flexible, temperature resistant plastic film secured, or adhered thereto. The plastic film defines either the outer surface of the temperature resistant insert, which is adapted to be placed on a supporting surface, or the inner surface of the insert, which is adapted to support the hot or cold food tray.

The temperature-resistant insert is specifically designed to withstand the heat generated from the food tray after cooking and when the tray is placed upon the temperature-resistant insert for transporting purposes. Therefore, by including this insert as part of the food packaging system, a person utilizing the system will have a properly heat-resistive insert readily available for use in protecting delicate supporting surfaces.

Other objects and a fuller understanding of the invention will be had by referring to the following description and claims of a preferred embodiment thereof, taken in conjunction with the accompanying drawings wherein like reference characters refer to similar parts throughout the several views, and in which:

BRIEF DESCRIPTION OF THE DRAWINGS

FIG. 1 is an exploded isometric view of the food packaging system of this invention;

FIG. 2 shows the food packaging system assembled for sale;

FIG. 5 is a top plan view of the temperature-resistant insert, or mat of this invention.

DESCRIPTION OF THE PREFERRED EMBODIMENT OF THE INVENTION

Figure 3:
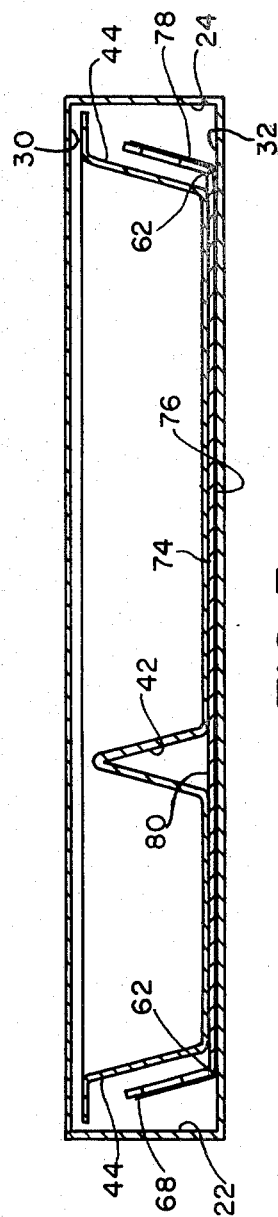
FIG. 3 is a transverse sectional view along line 3—3 of FIG. 2, showing the relative position of the components of the food packaging system of this invention.

Although specific terms are used in the following description for the sake of clarity, these terms are intended to refer only to the particular structure of my invention selected for illustration in the drawings and are not intended to define or limit the scope of the invention. It should be understood, as stated above, that for purposes of illustration only, this invention will be described with respect to food packaging systems of the pre-prepared frozen dinner type.

Referring to FIG. 1, the food packaging system 10 of this invention includes an outer sleeve 12, a food tray 14 and a temperature-resistant insert or mat 16. The outer sleeve 12 has an inner compartment or chamber 13 for receiving the food tray 14 and the temperature-resistant insert or mat 16. A tray cover 18, which is preferably made of a thin sheet of aluminum foil, covers the food contained in the food tray 14, and is crimped about the outer edges of said food tray.

The inner compartment 13 of the outer sleeve 12 has a transverse dimension defined between inner side surfaces 22 and 24; a longitudinal dimension defined between inner surfaces of spaced enclosures 26 and 28 (see FIG. 4); and a height defined between inner top surface 30 and inner bottom surface 32. The end closures 26 and 28 can be of any suitable structure, and does not form a part of the present invention. For example, the end closures 26 and 28 include side flaps 34, a top flap 36 and a bottom flap 38. In closed position the side flaps 34 are closed inwardly to overlie the inner compartment 13, and the top and bottom flaps are folded inwardly to overlie each other. The top and bottom flaps 36 and 38 can be secured to each other by any suitable means, such as adhesive or the like (FIG. 2). In one commercially available food packaging system, the top and bottom flaps of the outer sleeve are provided with cooperating tongues and grooves to secure said top and bottom flaps in their compartment closing position.

Referring to FIG. 1, the food tray 14 is defined by a bottom wall 42, side walls 44 and end walls 46. The bottom wall, side walls and end walls define a food-receiving compartment 48, which can, if desired be sub-divided into separate food-containing sections for a multi-course frozen dinner. The side walls 44 and end walls 46 terminate in upper margins 50 to define an opening into the food-receiving compartment 48. The opening of the food-receiving compartment 48 is sealed by a cover 18, which as stated earlier, is preferably made of aluminum foil which extends about outer margins of the food tray, and is secured thereto by crimping. In the preferred embodiment of the invention the side walls 44 and end walls 46 of the food tray extend upwardly from the bottom wall 42 in a diverging fashion. Therefore, the opening defined by the upper margins 50 of the food tray 14 is larger than the food supporting inner surface of said food tray.

Referring to FIGS. 1 and 5, the temperature-resistant insert or mat 16 includes a bottom section 60 defined by longitudinally extending scored lines 62 and transversely extending scored lines 64. Substantially triangular open sections 66 are disposed at the corners of the temperature-resistant insert 16 by a die-cut, or similar operation. These triangular openings 66 define side panels 68 in conjunction with the longitudinal score lines 62 and define end panels 70 in conjunction with the transverse score lines 66. The end panels 70 are provided with finger-gripping openings 72 in the form of elongated, oblong slots which can be formed in the temperature-resistant insert by a conventional die-cutting operation.

Figure 4:
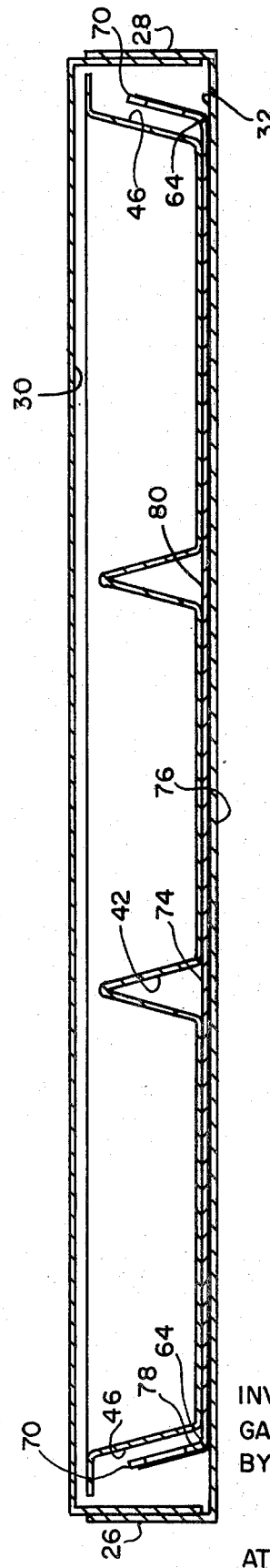
FIG. 4 is a longitudinal sectional view along line 4—4 of FIG. 2 showing the structural relationship of components of the food packaging system of this invention.

Referring to FIGS. 3 and 4, the temperature-resistant insert or mat 16 is comprised of a self-supporting substrate 74 of any suitable material, such as cardboard. If desired, the substrate 74 may be color printed or otherwise decorated for greater consumer-usage appeal. A thin, flexible temperature-resistant plastic film is adhered either to the top or bottom of the self-supporting substrate by any suitable means such as heat sealing, adhesive, or the like. In one embodiment of the invention, the thin, flexible temperature-resistant plastic film 76 is FEP fluorocarbon film sold by Du Pont under the trademark "Teflon" and is adhered to the inner side of the self-suporting substrate against which the heated and/or cold food tray rests. The FEP fluorocarbon film can be secured easily to the self-supporting substrate 74, and full technical information relating to said film is available from Du Pont.

In the preferred embodiment of this invention Type C Teflon FEP film is utilized. This film is cementable from one side only, and this cementable side is easily adhered to the self-supporting cardboard substrate 74.

In the preferred embodiment of this invention the FEP fluorocarbon film is secured to the self-supporting substrate 74 to define the outer surface 78 of the temperature-resistant insert. This outer surface 78 is adapted to seat on a supporting surface, and the hot food tray 14 is supported on an inner surface 80 of the temperature-resistant insert 16. Although in the preferred embodiment shown in FIGS. 3 and 4, the fluorocarbon film is secured to the side panels and end panels, as well as bottom section 60, it is within the purview of this invention to adhere the plastic film 76 to the substrate 74 only along the bottom section 60. It is also within the purview of this invention to secure the fluorocarbon film to the self-supporting substrate 74 to define the inner surface 80 of the temperature-resistant insert 16.

Referring to FIGS. 3 and 4, the structural relationship among the outer sleeve 12, the food tray 14 and the temperature-resistant insert or mat 16 is shown. Referring to FIG. 3, the bottom section 60 of the temperature-resistant insert 16 has a transverse dimension which is greater than the transverse dimension of the bottom wall 42 of the food tray 14, and is less than the transverse dimension between inner side surfaces 22 and 24 of the inner compartment 13 of the outer sleeve 12. The side panels 68 are infolded upwardly along the longitudinally extending scored lines 62, and are disposed adjacent and betwen corresponding side walls 44 of the food tray 14 and inner side surfaces 22 and 24 of the inner compartment 13.

Referring to FIG. 4, the longitudinal dimension of the food trap supporting section 60 of the temperature-resistant insert 16 is greater than the longitudinal dimension of the food tray 14 defined between end walls 46, and is less than the longitudinal dimension defined between inner surfaces of the end closures 26 and 28 of the outer sleeve 12. The end panels 70 of the temperature-resistant insert 16 are infolded along transversely extending scored lines 64, and these end panels 70 are disposed adjacent and between corresponding end walls 46 of the food tray 14 and inner surfaces of the end closures 26 and 28.

The finger-gripping opening 72 disposed in both end panels 70, permit easy removal of the temperautre-resistant insert 16, and the food tray 14 suported thereon, from the inner chamber 13 of the outer sleeve 12. In addition, following removal of the heated food tray from the oven (not shown) after the required recommended heating cycle, and placing on the heat-resistant mat, the finger-gripping openings 72 can be utilized to carry the heated food tray 14 to the desired dining area surface without the user's fingers coming in contact with the hot tray from the oven.

I claim:
1. In a food packaging system, the combination of
(A) an outer sleeve defining a hollow, inner compartment adapted to receive a food containing tray and a temperature resistant insert,
  (1) said inner compartment being defined between a top surface and bottom surface, a pair of spaced vertical side surfaces and a pair of spaced vertical end surfaces;
(B) a food tray positioned wtihin the inner compartment,
  (1) said food tray having dimensions in length and width to readily fit within the inner compartment,
  (2) said food tray containing food for heating purposes;

(C) an insert positioned within the inner compartment,
  (1) said insert having a top surface and a bottom surface,
  (2) said insert being interposed between the food tray and the bottom surface of the inner compartment,
  (3) said insert being of sufficient size to support the food tray,
  (4) said insert having a planar bottom section and upstanding side panels extending from the bottom section,
    (a) said side panels being disposed between the food tray and at least two of the said vertical inner compartment surfaces,
    (b) said side panels being cut out to provide openings for gripping purposes and,
  (5) said insert having sufficient strength to support the food tray; and
(D) a thin, flexible, temperature resistant, plastic film adhered to one of the surfaces of the insert,
  (1) said film being thinner than the insert,
  (2) said film substantially covering one said surface of the insert,
  (3) said film having temperature resistive qualities to prevent passage of heat from the food tray therethrough after the food has been cooked.

2. The invention of claim 1 wherein the film is FEP fluorocarbon film.

References Cited
UNITED STATES PATENTS

| | | | |
|---|---|---|---|
| 3,650,383 | 3/1972 | Nigro | 229—9 X |
| 3,580,484 | 5/1971 | Schneider | 206—4 X |
| 2,162,089 | 6/1939 | Kagen | 229—9 |
| 3,240,611 | 3/1966 | Williams | 99—171 LPX |
| 2,674,536 | 4/1954 | Fisher | 206—46 FX |
| 3,533,878 | 10/1970 | Aulik et al. | 206—46 FX |

OTHER REFERENCES

Modern Plastics Encylopedia Issue for 1964, 41(1A), pp. 18, 189, TP 986, A2M5.

LEONARD SUMMER, Primary Examiner

U.S. Cl. X.R.

99—171 P P; 206—46 F; 229—9, 14 H